R. B. AUSTIN.
PRESSURE GAGE.
APPLICATION FILED NOV. 3, 1915.
1,250,414.
Patented Dec. 18, 1917.
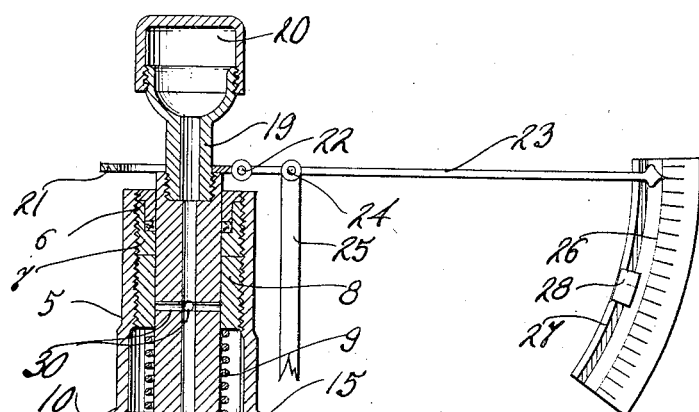
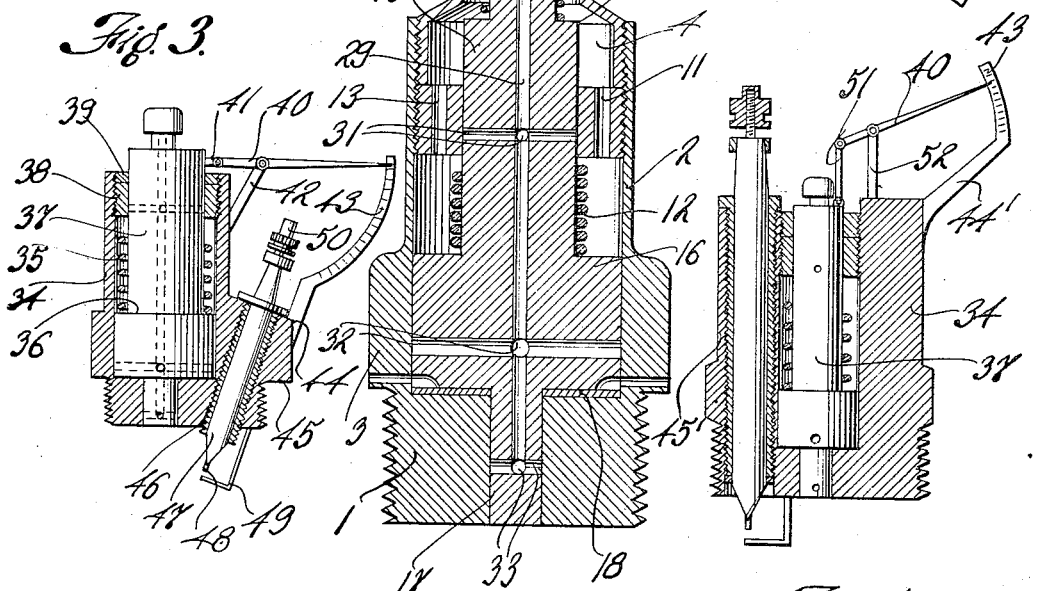

UNITED STATES PATENT OFFICE.

RAYMOND B. AUSTIN, OF DELAWARE, OHIO.

PRESSURE-GAGE.

1,250,414.  Specification of Letters Patent.  Patented Dec. 18, 1917.

Application filed November 3, 1915. Serial No. 59,456.

*To all whom it may concern:*

Be it known that I, RAYMOND B. AUSTIN, a citizen of the United States, residing at Delaware, in the county of Delaware and State of Ohio, have invented certain new and useful Improvements in Pressure-Gages, of which the following is a specification.

This invention has relation to certain new and useful improvements in pressure gages, and has for its primary object, the provision of a gage which will be especially adapted for use in connection with the cylinders of an internal combustion engine.

The invention has for another object, the provision of a pressure gage which will be composed of the minimum number of parts, accurate in operation and which may be readily regulated and adjusted.

The invention has for a further object the provision of a pressure gage which will be of such construction and operation as to be self-lubricating.

The invention has for a still further object, the provision of a pressure gage of the above-stated character which will include a comparatively weak primary spring and a stronger secondary spring, and means for adjusting the pressure springs within the inner and outer sections of the piston case of the gage.

With the above and other objects in view, the invention resides in the novel construction, combination, and arrangement of parts as hereinafter set forth in the specification, pointed out in the claims, and shown in the drawings, in which—

Figure 1 is a longitudinal section through the complete device in normal condition;

Fig. 2 is a bottom plan view;

Fig. 3 is an elevation, partly in section showing the modified form of the device;

Fig. 4 is a similar view of a further modified form of the invention.

Referring more particularly to the drawings in which similar reference characters designate corresponding parts throughout the several views, 1 designates the inner threaded end of the large or inner section 2 of the gage case adapted to be threaded into the cylinder of an internal combustion engine, the large inner section 2 of the case being provided with an enlarged portion 3 of hexagonal form or any other suitable form to receive a wrench or other tool employed for screwing the device into the cylinder, as will be readily understood.

Threaded in the outer open end of the inner section 2 of the case is the enlarged exteriorly threaded end 4 of the outer case section 5, said outer case section 5 having a centrally apertured guide nut 6 threaded therein, after the jam nut 7 has been threaded to position against the tension nut 8 for the comparatively weaker tension spring 9 of the gage piston 16. The reduced outer end of the piston stem 10 is adapted to reciprocate through the tension nut 8, and jam nut 7, upon operation of the gage, while the larger intermediate portion of said stem 10 reciprocates through the second tension nut 11 threaded in the large inner case section 2, one end of the stronger tension spring 12 being normally spaced from said tension nut 11.

It will be understood that the tension nut 11 may be provided with suitable tool receiving openings 13, as shown in Fig. 1 of the drawings, to receive a tool for adjusting said nut 11 within said large inner case section 2, if desired. It will also be understood that the comparatively weaker primary tension spring 9 has one end bearing against the tension nut 8 while its opposite end bears against the shoulder 15 connecting the reduced outer end of the piston stem 10 with the larger intermediate portion of the same. The stronger or secondary tension spring 12 rests upon the gage piston 16 and surrounds the lower portion of the stem 10. The gage piston 16 has an extension 17 of small diameter projecting from its large inner end and slidably engaged through the threaded end 1 of the inner case section 2, the free end of the extension being normally flush with the inner end of said large inner case section 2 and is the only portion of the piston subjected to fluid pressure. A spacing washer 18 may, if desired, be positioned between the large inner end of the gage piston 16 and the solid portion of the inner enlarged end 1 of the inner case section 2.

Threaded in the outer end of the piston stem 10 is a grease cup 19 having a cap 20 secured upon the same. Resting upon the end of the piston stem 10, is the ring 21 connected, as shown at 22, to one end of the indicator rod 23. The indicator rod 23 is pivoted, as shown at 24 upon a suitable support 25, and has its free end resting upon and adapted to ride over the scale plate 26, in the curved guide groove 27 of which is positioned a spring clip 28 adapted to be forced in one direction by the free end of the indicator rod 23 to indicate the maximum pressure within the cylinder.

The gage piston 16 and its stem 10 has a main oil duct 29 extending longitudinally of the same and having one end communicating with the hollow stem of the grease cup 19. The branch oil ducts 30, 31, 32, and 33 are extended radially from the main oil duct 29 to conduct a lubricant to the tension nut 8, the tension nut 11, the peripheral surface of the piston 16 and the wall of the extension 17, respectively, and thereby reduce friction to the minimum during reciprocation of the gage piston.

From the foregoing, it will be readily seen that any fluid pressure operating upon the inner end of the piston extension will force the piston 16 outwardly and compress the weaker spring 9. Should the pressure increase sufficiently, the stronger or secondary spring 12 will be lifted by the piston against the tension nut 11 and compressed between the two parts. It will also be apparent that the free end of the indicating rod 23 rides over the scale plate 26 as the pressure against the piston extension 17 varies and the position of the spring clip 28 will indicate the maximum pressure.

In Fig. 3 I have shown a modified form of the device, in which the case 34 is composed of one section only, and a single tension spring 35 is positioned therein around the piston stem 37 and bearing against the top of the piston 36, while its opposite end is spaced from the tension nut 38 in the outer end of the case 34, a suitable guide nut 39 being threaded in said outer end of the case 34 outwardly of the tension nut 38. In this form of the invention, the indicating rod 40 is connected with the piston 37 as shown at 41 and pivoted upon a supporting arm 42 projecting from said case 34, the free end of the indicating rod 40 riding over the graduated arcuate arm 43 projecting from the support 44 which is also carried by an extension 45 of the case 34.

The extension 45 also serves to hold a spark plug, and while any preferred form of spark plug may be mounted therein, I prefer to use the form illustrated which consists of the usual sleeve 46 threaded in an inclined position in the extension 45 and having mounted therein the spark plug body 47 composed of porcelain or any other suitable insulating material and having a wire extending through the same with one end projecting to form the sparking point 48 spaced from the ground wire 49 secured to the inner end of the case 34. The usual binding post cap 50 is threaded upon the extension carried upon the outer end of the spark plug body 47 to secure a conducting wire upon said spark plug, as will be readily understood by referring to the drawings.

In Fig. 4, I have shown a further modified form of the invention, in which the construction is practically the same as in the form shown in Fig. 3 with the exception of the extension 45' which is extended vertically of the case 34 and the link 51 for connecting the indicator arm 40 with the outer end of the gage piston 37. In this form of the device the indicator arm 40 is supported upon the supporting member 52 projecting upwardly from said case 34 and the supporting arm 44' for the graduated arcuate arm 43 is secured to the upper portion of the case 34. With these exceptions, the device shown in Fig. 4 is of substantially the same construction and operation as the form shown in Fig. 3.

While the preferred embodiments of the invention have been shown and described, it will be understood that minor changes in the details of construction, and arrangement of parts may be resorted to within the scope of the appended claims without departing from the spirit of the invention or sacrificing any of the advantages of the same.

What is claimed is:

1. A pressure gage comprising a separable two-part casing of different diameters connected endwise, a piston insertible within the larger part of said casing adapted to be moved endwise in one direction by fluid pressure, a stem extending from said piston through the smaller part of said casing and beyond the outer end thereof, a shoulder being formed on said stem between the piston and said outer end, a primary compression spring for said piston surrounding said stem and bearing at one end against the shoulder thereon, means for adjustably engaging the smaller part of the casing for varying the tension of said primary compression spring, a stronger secondary compression spring for said piston inoperative and free of tension during the first part of the piston movement, means adjustable within the larger part of the casing for engaging said secondary spring, a scale, and an indicator rod connected to said piston stem and adapted to ride over said scale.

2. A pressure gage comprising a separable two-part casing of different diameters threaded together endwise, a piston insertible within the larger part of said casing and adapted to be moved in one direction by fluid pressure, a stem projecting from said piston through the smaller part of the casing and beyond the end thereof, a shoulder being formed on said stem, a primary compression spring for said piston surrounding said piston stem and bearing at one end against the shoulder thereon, means threaded within the smaller end of the casing for adjusting the tension of said primary compression spring, a stronger secondary compression spring for said piston inoperative and free of tension during the first part of the piston movement, means threaded within the larger part of the casing movable to and from said secondary compression spring to change the point in the movement of the piston when said spring becomes operative, a scale, and an indicator rod connected at one end to said piston rod and adapted to be operated by said piston to cause its opposite end to ride over said scale.

3. A pressure gage comprising a casing, a piston within said casing and movable in one direction by fluid pressure, primary resilient means constantly acting on said piston against the force of fluid pressure, means within the casing for varying the tension of said spring, a stronger secondary spring for and supported by the piston and inoperative during the first part of the piston movement, means within the casing adjustable to and from the spring to change the point when said spring becomes operative, and pressure indicating means operated by the piston.

4. A pressure gage comprising a two-part casing of different diameters connected endwise, a piston within the larger part of said casing movable in one direction by fluid pressure, a stem projecting from said piston through the end of the smaller part of the casing, said stem being of two diameters, a primary compression spring surrounding the smaller portion of the piston stem and bearing at one end on the larger portion, adjustable means for said spring encircling the piston stem and threaded in the smaller part of the casing, a secondary and stronger compression spring surrounding the larger part of the stem and bearing at one end on the piston, an adjustable collar surrounding the larger part of the piston stem and threaded in the larger part of the casing and adapted to be moved to and from said spring, said collar being spaced from the spring and the latter free of tension during the first portion of the movement of said piston, and indicating means connected with and movable by said piston.

In testimony whereof I affix my signature in presence of two witnesses.

RAYMOND B. AUSTIN.

Witnesses:
WILLIAM CAREY CRANE, Jr.,
RANDOLPH ROBERTSON.